United States Patent
Sekine

Patent Number: 5,526,186
Date of Patent: Jun. 11, 1996

[54] ZOOM LENS SYSTEM

[75] Inventor: Atushi Sekine, Kasukabe, Japan

[73] Assignee: Nikon Corporation, Tokyo, Japan

[21] Appl. No.: 407,074

[22] Filed: Mar. 20, 1995

[30] Foreign Application Priority Data

Mar. 29, 1994 [JP] Japan .................. 6-082455

[51] Int. Cl.⁶ .................................. G02B 15/14
[52] U.S. Cl. .................. 359/683; 359/676; 359/707; 359/740
[58] Field of Search .................. 359/683, 649, 359/676, 707, 738, 740, 766

[56] References Cited

U.S. PATENT DOCUMENTS

| | | | |
|---|---|---|---|
| 3,970,367 | 7/1976 | Tsuji | 359/683 |
| 4,437,732 | 3/1984 | Ishiyama | 359/683 |
| 4,637,690 | 1/1987 | Miyamae et al. | 359/683 |
| 4,749,266 | 6/1988 | Takahashi et al. | 359/683 |
| 4,854,685 | 8/1989 | Corbasson | 359/683 |
| 4,896,950 | 1/1990 | Endo et al. | 359/683 |
| 5,388,004 | 2/1995 | Adachi | 359/683 |
| 5,440,430 | 8/1995 | Sato | 359/683 |

*Primary Examiner*—Georgia Y. Epps
*Assistant Examiner*—Evelyn A. Lester
*Attorney, Agent, or Firm*—Shapiro and Shapiro

[57] ABSTRACT

A zoom lens system for projecting an image of an object on a screen, comprises, sequentially from a screen side, a first lens group having a positive refracting power, a second lens group having a negative refracting power, a third lens group having a positive refracting power, a fourth lens group having a negative refracting power and a fifth lens group having a positive refracting power. The first lens group is so disposed as to be movable for focusing along an optical-axis direction. The second lens group is so disposed as to be movable for zooming along the optical-axis direction. The third lens group is so disposed as to be movable for correcting a fluctuation in image position due to the zooming. The fourth and fifth lens groups are fixed with respect to the optical-axis direction during the zooming. The third lens group has, sequentially from the screen side, a front lens unit having a negative refracting power and a rear lens unit having a positive refracting power.

9 Claims, 3 Drawing Sheets

ZOOM LENS SYSTEM

BACKGROUND OF THE INVENTION

1. Field of the Invention

The present invention relates generally to a zoom lens system and, more particularly, to a zoom lens system suited as a projection lens for a liquid crystal projector.

2. Related Background Art

In recent years, with a spread of a liquid crystal projector for a domestic use, there has been rapidly increased demands for reducing a weight thereof, attaining down-sizing thereof and saving its energy.

First, a liquid crystal panel is being miniaturized for reducing both of the weight and the size of the liquid crystal projector. Recently, even a hi-vision oriented liquid crystal projector which pursues a high image quality is mounted with a liquid crystal panel as small as 2 inches. With the down-sizing of this liquid crystal panel, the down-sizing of a projection optical system and of an illumination optical system has been realized. Thus, the downsizing of the liquid crystal panel makes a great contribution to reducing the weight and the size of the liquid crystal projector apparatus.

Further, there is a necessity for illuminating the liquid crystal panel with the unidirectionally-polarized light beam in terms of a characteristic of the liquid crystal panel. For this reason, it is not a conventional practice that the light beams polarized in other directions are used as the illumination light. Recently, however, the conventionally unused light beams polarized in other directions can be utilized as the illumination light by a combiner. Hence, if an output of the light source is the same, it is possible to obtain a picture which is brighter by approximately 1.5 time than in the prior art. In other words, the light source output that is approximately ⅔ as small as the conventional one may suffice for obtaining the picture exhibiting the same brightness, and, therefore, utilizing the light beams polarized in other directions as the illumination light by use of the combiner greatly contributes to the saving of the energy of the liquid crystal projector.

There exists, however, an inconvenience inherent in the conventional liquid crystal projector, wherein the screen does not yet have a brightness enough to enjoy the picture in a room that is light to some extent.

Further, with the down-sizing of the above-mentioned liquid crystal panel, a liquid crystal panel magnifying power for obtaining the picture with the same size increases, resulting in such a inconvenience that the picture is further darkened.

Under such circumstances, there rapidly increases a demand for a bright projection lens in order to obtain the bright picture.

By the way, if the projection lens is set brighter, as a matter of course, the projection lens augments in size, and, besides, the number of constructive lenses increases. In addition, there is a necessity for making incident a greater amount of oblique light beams (incident from the oblique direction with respect to the optical axis) in order to secure a marginal light quantity. As a result, the aberration is hard to correct, and this in turn causes an occurrence of a comatic flare. Accordingly, in the projection lens for the conventional liquid crystal projector, generally, the F-number is on the order of 3.5 to 4.0, and the marginal light quantity rate (vignetting factor) is approximately 50%.

SUMMARY OF THE INVENTION

Under such circumstances, it is a primary object of the present invention to provide a zoom lens system capable of exhibiting a high brightness as a projection lens for a liquid crystal projector, improving a marginal light quantity rate, reducing a comatic flare, showing a high contrast and a high resolution but being small both in weight and in size.

To accomplish the above object, according to one aspect of the present invention, there is provided a zoom lens system for projecting an image of an object on a screen, sequentially from a screen side, comprising: a first lens group G1 having a positive refracting power; a second lens group G2 having a negative refracting power; a third lens group G3 having a positive refracting power; a fourth lens group G4 having a negative refracting power; and a fifth lens group G5 having a positive refracting power. The first lens group G1 is so disposed as to be movable for focusing along an optical-axis direction. The second lens group G2 is so disposed as to be movable for zooming along the optical-axis direction. The third lens group G3 is so disposed as to be movable for correcting a fluctuation in image position due to the zooming. The fourth and fifth lens groups G4, G5 are fixed with respect to the optical-axis direction during the zooming. The third lens group G3 has, sequentially from the screen side, a front lens unit G31 having a negative refracting power and a rear lens unit G32 having a positive refracting power.

According to the preferred aspect of the present invention, preferably the third lens group G3 has, sequentially from the screen side, one single lens having a negative refracting power and one single lens having a positive refracting power. Further, the fifth lens group G5 has preferably at least one lens composed of a medium showing an abnormal partial dispersibility.

Generally, in the liquid crystal projector, the light beams from the light source are dispersed into light beams in red, green and blue by a dichroic mirror, and the respective light beams are modulated by the liquid crystal panel. Then, the thus modulated light beams are again synthesized by the dichroic mirror and thereafter projected by the projection lens, thereby obtaining a color picture.

As described above, the dichroic mirror is interposed between the liquid crystal panel and the projection lens, and, hence, the liquid crystal projector oriented projection lens requires a relatively long air spacing between the liquid crystal panel and the projection lens itself. Further, it is required that an entrance pupil be sufficiently remote in order to cause no color shading derived from an angular dependency of a spectral characteristic of the dichroic mirror.

For this purpose, according to the present invention, an aperture stop is disposed between the third lens group G3 and the fourth lens group G4. The positive refracting power is imparted to the third lens group G3 moving along the optical axis to correct a fluctuation in terms of an image position due to zooming. The negative refracting power and the positive refracting power are respectively given to the fourth lens group G4 and the fifth lens group G5 which are fixed during the zooming.

The zoom lens system according to the present invention includes the fourth lens group having the negative refracting power and the fifth lens group G5 having a positive refracting power. This zoom lens can be designed so that the spacing between the fourth lens group G4 and the fifth lens group G5 is smaller than in the zoom lens of such a type that both of the fourth lens group G4 and the fifth lens group G5 have the positive refracting power, and the entrance pupil is sufficiently remote.

Further, according to the present invention, the third lens group G3 immediately before the aperture stop is designed to have the positive refracting power, thereby making it possible to properly set the air spacing between the liquid crystal panel conceived as an object and the zoom lens system (i.e., the fifth lens group G5, closest to the liquid crystal panel, of the zoom lens system) so as not to be longer than needed and, at the same time, restrain a bounce of the oblique light beam through the fourth lens group G4.

In this connection, the zoom lens can be also constructed in such an arrangement that the third lens group G3 has the negative refracting power. In this case, however, the air spacing between the liquid crystal panel and the fifth lens group G5 becomes longer than required. As a result, this brings about an increases in terms of size of the fifth lens group G5, which is contrary to the down-sizing with a reduction in weight as one of the objects of the present invention.

It is another object of the present invention to provide the light-weight and small-sized zoom lens wherein the F-number is on the order of 2.7, the marginal light quantity rate is approximately 70%, and, besides, both of the contrast and the resolution are high. For this purpose, it is of importance that the aberration causing the comatic flare of the oblique light beam is well corrected.

Then, according to the present invention, the third lens group G3 includes the front lens unit G31 having the negative refracting power and the rear lens unit G32 having the positive refracting power, these lens units G31, G32 being continuously disposed, whereby the aberration causing the comatic flare is well corrected.

Especially when comparing a degree of correcting the comatic flare and a rise in costs due to an increase in the number of constructive lenses, it is preferable that the third lens group G3 is constructed of, sequentially from the screen side, the single lens having the negative refracting power and the single lens having the positive refracting power.

As discussed above, it is required that a predetermined air spacing be ensured between the liquid crystal panel and the fifth lens group G5. For this purpose, an image forming magnification β of the third lens group G3 desirably falls within a range of |β|≧1 on the assumption that the object exists on the screen. When assuming that the object exists on the screen, and if the image forming magnification β of the third lens group G falls within the range of |β|<1, the positive refracting power of the third lens group G3 becomes relatively strong. As a result, the air spacing between the liquid crystal panel and the fifth lens group G5 becomes too small. Then, if the negative refracting power of the fourth lens group G4 is intensified to refrain the above air spacing from being too small, the bounce of the oblique light beam through the fourth lens group G4 increases, resulting in a difficulty of correcting the comatic flare.

Further, the refracting powers of the third lens group G3 and of the fourth lens group G4 augment, and, therefore, the number of the constructive lenses increases. This is contrary to the object of attaining the down-sizing with the reduction in weight. When the image forming magnification β (lateral magnification β) of the third lens group G3 moving along the optical axis to keep constant the image position during the zooming falls within the range of |β|>1, a moving locus of the third lens group G3 during the zooming takes a concave shape on the screen side.

In general, in the case of the liquid crystal projector unlike a projector using a CRT, it is impossible to electrically correct a distortion and a registration when synthesizing the respective pictures in red, green and blue. Accordingly, it is required that the distortion and the magnification chromatic aberration be small in the liquid crystal projector oriented projection lens.

For this purpose, according to the present invention, at least one lens composed of a medium exhibiting the abnormal partial dispersibility is used for correct the chromatic aberration.

Particularly in the case of the present invention, a zoom ratio is on the order of 1.8, and hence there is almost no problem with respect to a secondary spectrum of the on-axis chromatic aberration at a telephoto end. The first lens group G1 does not involve the use of the lens composed of the medium exhibiting the abnormal partial dispersibility. Also, if the lens composed of the medium having the abnormal partial dispersibility is employed for the first lens group G1, the secondary spectrum of the on-axis chromatic aberration at the telephoto end is reduced. However, a secondary spectrum of the magnification chromatic aberration increases all the more.

On the other hand, if the fifth lens group G5 involves the use of the lens composed of the medium exhibiting the abnormal partial dispersibility, the secondary spectrum of the on-axis chromatic aberration is reduced by substantially the same quantity over the range from the wide-angle end to the telephoto end, and, besides, the secondary spectrum of the magnification chromatic aberration is also decreased.

Hence, according to the present invention, it is preferable that at least one lens composed of the medium showing the abnormal partial dispersibility is employed in the fifth lens group G5. Note that the lens composed of the medium exhibiting the abnormal partial dispersibility is preferably used in only the fifth lens group G5 but is not employed in other lens groups in a comparative consideration of an increase in the costs due to the use of the lens made of the medium showing the abnormal partial dispersibility with an enhancement in terms of the image forming performance because of the reductions both in the secondary spectrum of the on-axis chromatic aberration and in the secondary spectrum of the magnification chromatic aberration.

Hereinafter, the respective conditional expressions of the present invention will be explained.

According to this invention, as a condition for ensuring a telecentric property to some extent, it is desirable that the following conditional expression (1) be satisfied:

$$0.7 < |e4/(f4+f5)| < 2.0 \tag{1}$$

where f4: the focal length of the fourth lens group G4, f5: the focal length of the fifth lens group G5, and e4: the principal point spacing between the fourth lens group G4 and the fifth lens group G5.

If under a lower limit value of the conditional expression (1), the spacing between the entrance pupil and the liquid crystal panel becomes too short, and, undesirably, there increases a possibility in which color shading happens when synthesizing three pictures in red, Green and blue.

Whereas if over an upper limit value of the conditional expression (1), the entrance pupil becomes excessively remoter than needed, resulting in a scale-up of the fifth lens group G5. Further, a height of the principal ray traveling through the fifth lens group G5 becomes too large, and, undesirably, it is difficult to correct a curvature of the magnification chromatic aberration caused in the fifth lens group G5.

Further, for obtaining a good image forming performance and, at the same time, securing a predetermined air spacing between the liquid crystal panel and the fifth lens group G5, it is preferable that the following conditional expressions (2) through (5) be satisfied:

$$0.7 < |f3/f4| < 1.3 \quad (2)$$

$$0.35 < |f2/fw| < 0.65 \quad (3)$$

$$v3p/v3n < 1 \quad (4)$$

$$1.0 < |f3n/f3p| < 2.5 \quad (5)$$

where f2: the focal length of the second lens group G2, f3: the focal length of the third lens group G3, fw: the focal length of the entire lens system at the wide-angle end, v3n: the average value of the Abbe numbers of the lenses constituting the front lens unit G31 in the third lens group G3, v3p: the average value of the Abbe numbers of the lenses constituting the rear lens unit G32 in the third lens group G3, f3n: the focal length of the front lens unit G31 in the third lens group G3, and f3p: the focal length of the rear lens unit G32 in the third lens group G3.

The conditional expression (2) provides a condition for securing the proper air spacing between the liquid crystal panel and the fifth lens group G5.

If under a lower limit value of the conditional expression (2), there is produced a lack of the air spacing between the liquid crystal panel and the fifth lens group G5, and the three-color synthesizing optical system can not be interposed therebetween.

Whereas if over an upper limit value of the conditional expression (2), the air spacing between the liquid crystal panel and the fifth lens group G5 becomes larger than required, and this undesirably brings about the scale-up of the fifth lens group G5.

The conditional expression (3) gives a condition for obtaining the good image forming performance over the entire zoom area.

If under a lower limit value of the conditional expression (3), fluctuations in a variety of aberrations due to the zooming augment, and it is hard to well correct the aberration over the entire zoom area.

Whereas if over an upper limit value of the conditional expression (3), the moving distance of the second lens group G2 during the zooming increases, and, undesirably, the scale-up of the lens is brought about.

The conditional expression (4) gives a condition for well correcting the chromatic aberration.

When departing from a range of the conditional expression (4), it is difficult to attain well-corrected states of both of the on-axis chromatic aberration and the magnification chromatic aberration.

The conditional expression (5) provides a condition for well correcting the comatic aberration.

If under a lower limit value of the conditional expression (5), an upward comatic aberration in the vicinity of the maximum image height becomes large on the negative side, and, undesirably, the comatic flare is caused.

Whereas if over an upper limit value of the conditional expression (5), the upward comatic aberration of the intermediate image height becomes large on the positive side, and, undesirably, the comatic flare is still produced.

BRIEF DESCRIPTION OF THE DRAWINGS

Other objects and advantages of the present invention will become apparent during the following discussion in conjunction with the accompanying drawings, in which.

DESCRIPTION OF THE PREFERRED EMBODIMENTS

Embodiments of the present invention will hereinafter be discussed with reference to the accompanying drawings.

In each embodiment, a zoom lens system according to the present invention includes, sequentially from a screen side, a first lens group G1 having a positive refracting power, a second lens group G2 having a negative refracting power, a third lens group G3 having a positive refracting power, a fourth lens group G4 having a negative refracting power and a fifth lens group G5 having a positive refracting power. The third lens group G3 includes, sequentially from the screen side, a front lens unit G31 having a negative refracting power and a rear lens unit G32 having a positive refracting power.

Then, focusing is performed by moving the first lens group G1 along an optical axis. Zooming is effected by moving the second lens group G2 along the optical axis. The fourth lens group G4 and the fifth lens group G5 are fixed during the zooming. A fluctuation in terms of an image position due to the zooming is corrected by moving the third lens group G3 along the optical axis.

EMBODIMENT 1

Figure 1:
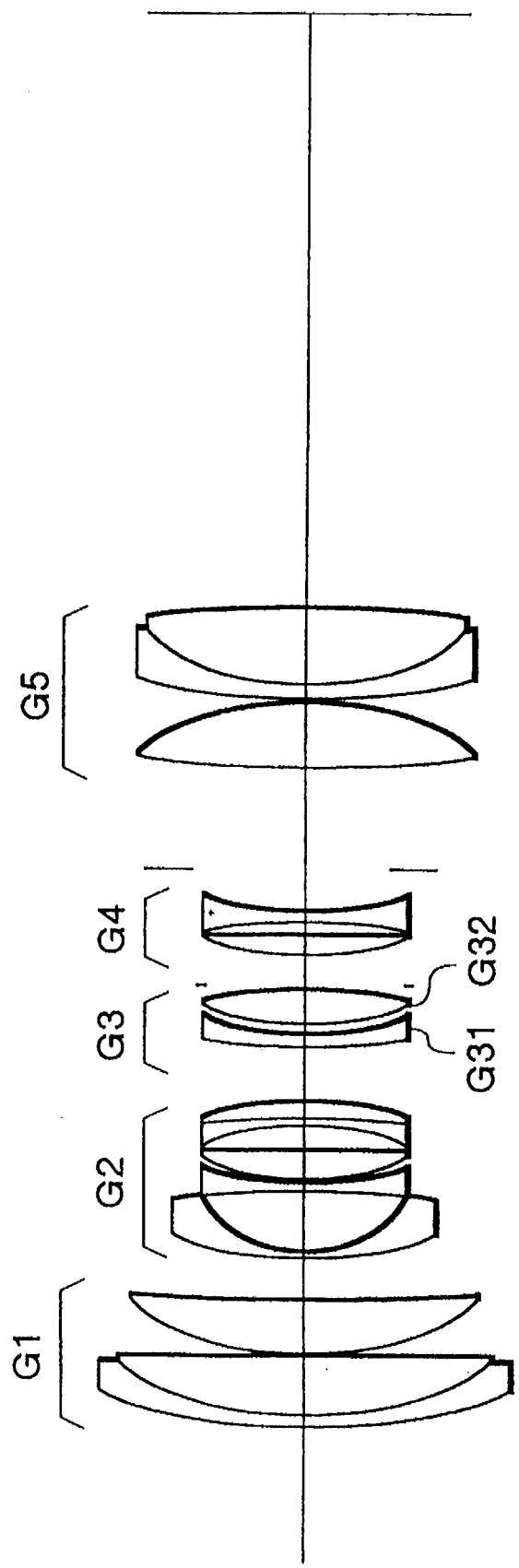
FIG. 1 is a view illustrating a layout of a zoom lens in a first embodiment.

FIG. 1 is a view illustrating a layout of the zoom lens system in a first embodiment of the present invention.

The illustrated zoom lens system comprises, sequentially from the screen side, a first lens group G1, a second lens group G2, a third lens group G3, a fourth lens group G4 and a fifth lens group G5. The first lens group G1 is composed of a cemented lens consisting of a negative meniscus lens with its convex surface toward the screen side and a positive meniscus lens with its convex surface toward the screen side and a positive meniscus lens with its convex surface toward the screen side. The second lens group G2 is composed of a negative meniscus lens with its convex surface toward the screen side, a biconcave lens, a positive meniscus lens with its convex surface toward the screen side and a cemented lens consisting of a negative meniscus lens with its concave surface toward the screen side and a positive meniscus lens with its concave surface toward the screen side. The third lens group G3 is composed of a negative meniscus lens G31 with its convex surface toward the screen side and a biconvex lens G32. The fourth lens group G4 is composed of a positive meniscus lens with its convex surface toward the screen side and a biconcave lens. The fifth lens group G5 is composed of a biconvex lens and a cemented lens consisting of a negative meniscus lens with its convex surface toward the screen side and a biconvex lens.

Following Table 1 shows values of data in the embodiment 1 of the present invention. In Table 1, the numeral at the left end indicates the order of respective lens surfaces from the screen side, r designates the radius of curvature of each lens surface, d represents the spacing between the lens surfaces, and n and v denote the refractive index and the Abbe number with respect to the d-line ($\lambda$=587.6 nm). Note that f is the focal length, FNO is the F-number, 2$\omega$ is the view angle, and d0 is the on-axis air spacing between the screen and the lens surface closest to the screen.

Incidentally, the refractive index of a medium exhibiting an abnormal partial dispersibility is marked with (*).

TABLE 1 f = 84.0–151.0 mm
FNO = 2.71
2$\omega$ = 23.0–12.8°

|    | r          | d              | v     | n        |
|----|------------|----------------|-------|----------|
| 1  | 143.3391   | 3.000          | 23.83 | 1.84666  |
| 2  | 82.9569    | 14.800         | 60.35 | 1.62041  |
| 3  | 666.2068   | 0.100          |       |          |
| 4  | 73.6720    | 12.200         | 60.35 | 1.62041  |
| 5  | 318.9764   | (d5 = Variable)|       |          |
| 6  | 106.0249   | 1.700          | 42.97 | 1.83500  |
| 7  | 33.3692    | 15.000         |       |          |
| 8  | −223.6107  | 1.700          | 49.61 | 1.77250  |
| 9  | 70.2043    | 0.100          |       |          |
| 10 | 53.3677    | 8.500          | 25.46 | 1.80518  |
| 11 | 65607.9883 | 5.850          |       |          |
| 12 | −56.4374   | 2.000          | 49.61 | 1.77250  |
| 13 | −300.0000  | 4.500          | 25.46 | 1.80518  |
| 14 | −109.3596  | (d14 = Variable)|      |          |
| 15 | 316.5466   | 2.000          | 46.51 | 1.80420  |
| 16 | 61.0670    | 2.000          |       |          |
| 17 | 68.9191    | 9.000          | 33.27 | 1.80610  |
| 18 | −131.9640  | (d18 = Variable)|      |          |
| 19 | ∞          | 8.650          | (Aperture Stop) |  |
| 20 | 88.2355    | 6.000          | 42.97 | 1.83500  |
| 21 | 4314.0338  | 1.800          |       |          |
| 22 | −169.7237  | 2.000          | 25.46 | 1.80518  |
| 23 | 63.2025    | 11.081         |       |          |
| 24 | ∞          | 27.000         | (Fixed Stop) |     |
| 25 | 355.4548   | 17.300         | 71.31 | *1.56907 |
| 26 | −71.8945   | 1.000          |       |          |
| 27 | 210.6063   | 2.500          | 37.35 | 1.83400  |
| 28 | 70.5590    | 18.700         | 71.31 | *1.56907 |
| 29 | −250.8020  | 155.695        |       |          |

(Variable Spacing in Zooming and Focusing)

When d0 = 9073.3 mm

| f   | 84.000 | 110.000 | 151.000 |
|-----|--------|---------|---------|
| d5  | 0.860  | 13.855  | 25.269  |
| d14 | 26.128 | 16.674  | 1.743   |
| d18 | 4.742  | 1.201   | 4.717   |

When d0 = 4546.1 mm

| f   | 84.000 | 110.000 | 151.000 |
|-----|--------|---------|---------|
| d5  | 2.366  | 15.361  | 26.775  |
| d14 | 26.128 | 16.674  | 1.743   |
| d18 | 4.742  | 1.201   | 4.717   |

(Condition Corresponding Value)

f2 = −41.02265
f3 = 133.33082
f4 = −136.83738
f5 = 86.58017
e4 = 42.94460
f3n = −94.41527
f3p = 57.31062
(1) |e4/(f4 + f5)| = 0.854
(2) |f3/f4| = 0.974
(3) |f2/fw| = 0.488
(4) v3p/v3n = 0.715
(5) |f3n/f3p| = 1.647

EMBODIMENT 2

Figure 2:
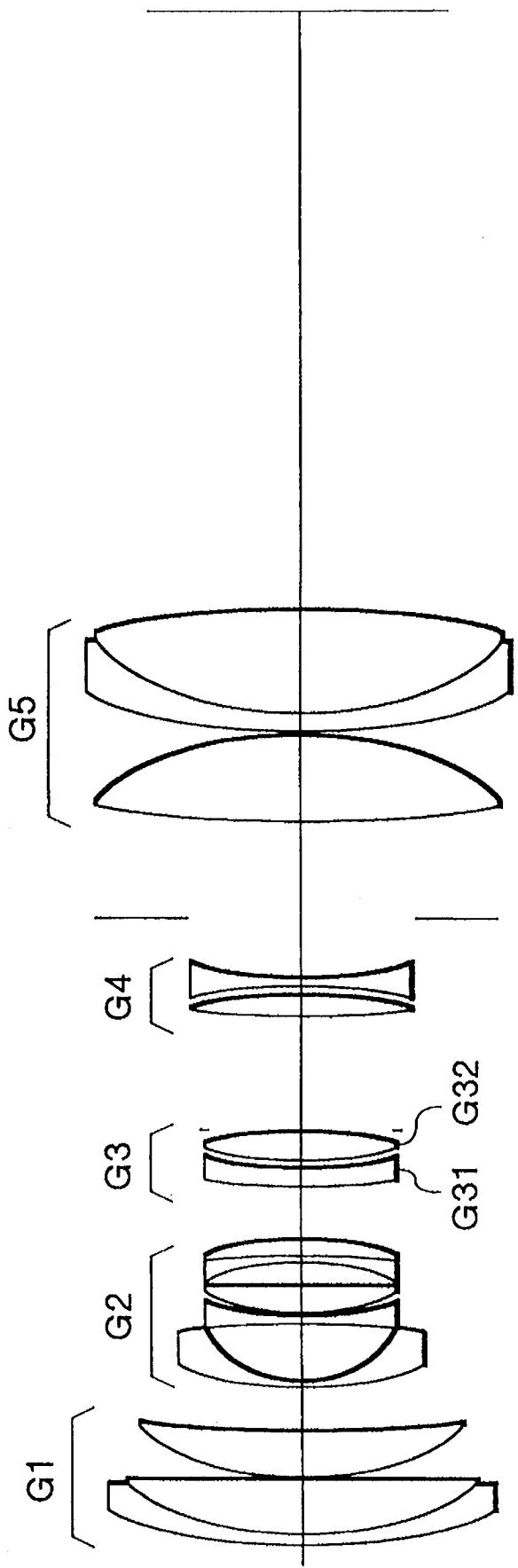
FIG. 2 is a view illustrating a layout of the zoom in a second embodiment.

FIG. 2 is a view illustrating a layout of the zoom lens system in a second embodiment of the present invention.

The illustrated zoom lens system comprises, sequentially from the screen side, the first lens group G1, the second lens group G2, the third lens group G3, the fourth lens group G4 and the fifth lens group G5. The first lens group G1 is composed of the cemented lens consisting of the negative meniscus lens with its convex surface toward the screen side and the positive meniscus lens with its convex surface toward the screen side and the positive meniscus lens with its convex surface toward the screen side. The second lens group G2 is composed of the negative meniscus lens with its convex surface toward the screen side, the biconcave lens, the positive meniscus lens with its convex surface toward the screen side and the cemented lens consisting of the negative meniscus lens with its concave surface toward the screen side and the positive meniscus lens with its concave surface toward the screen side. The third lens group G3 is composed of the negative meniscus lens G31 with its convex surface toward the screen side and the biconvex lens G32. The fourth lens group G4 is composed of a biconvex lens and a biconcave lens. The fifth lens group G5 is composed of the biconvex lens and the cemented lens consisting of the negative meniscus lens with its convex surface toward the screen side and the biconvex lens.

Following Table 2 shows values of data in the embodiment 2 of the present invention. In Table 2, the numeral at the left end indicates the order of respective lens surfaces from the screen side, r designates the radius of curvature of each lens surface, d represents the spacing between the lens surfaces, and n and v denote the refractive index and the Abbe number with respect to the d-line ($\lambda$=587.6 nm). Note that f is the focal length, FNO is the F-number, 2$\omega$ is the view angle, and d0 is the on-axis air spacing between the screen and the lens surface closest to the screen.

Incidentally, the refractive index of a medium exhibiting an abnormal partial dispersibility is marked with (*).

TABLE 2 f = 84.0–151.0 mm
FNO = 2.71
2$\omega$ = 23.0–12.8°

|    | r          | d              | v     | n       |
|----|------------|----------------|-------|---------|
| 1  | 136.3373   | 3.000          | 23.83 | 1.84666 |
| 2  | 81.7000    | 14.800         | 60.35 | 1.62041 |
| 3  | 603.5928   | 0.100          |       |         |
| 4  | 75.8233    | 12.200         | 60.35 | 1.62041 |
| 5  | 333.5690   | (d5 = Variable)|       |         |
| 6  | 105.4418   | 1.700          | 42.97 | 1.83500 |
| 7  | 33.4735    | 15.000         |       |         |
| 8  | −202.8521  | 1.700          | 49.61 | 1.77250 |
| 9  | 69.5142    | 0.100          |       |         |
| 10 | 53.5379    | 8.500          | 25.46 | 1.80518 |
| 11 | 13275.2440 | 5.850          |       |         |
| 12 | −54.7758   | 2.000          | 49.61 | 1.77250 |
| 13 | −230.5387  | 4.500          | 25.46 | 1.80518 |
| 14 | −98.9369   | (d14 = Variable)|      |         |
| 15 | 222.4063   | 2.000          | 42.97 | 1.83500 |
| 16 | 74.4122    | 2.500          |       |         |
| 17 | 90.0707    | 8.300          | 33.27 | 1.80610 |
| 18 | −138.7028  | (d18 = Variable)|      |         |
| 19 | ∞          | 30.300         | (Aperture Stop) | |
| 20 | 269.7197   | 6.700          | 42.97 | 1.83500 |
| 21 | −128.4455  | 1.800          |       |         |
| 22 | −110.7413  | 2.000          | 23.83 | 1.84666 |
| 23 | 87.3927    | 20.756         |       |         |
| 24 | ∞          | 27.000         | (Fixed Stop) |    |

TABLE 2-continued f = 84.0–151.0 mm
FNO = 2.71
2ω = 23.0–12.8°

| | | | | |
|---|---|---|---|---|
| 25 | 566.1143 | 22.700 | 71.31 | *1.56907 |
| 26 | −89.7640 | 1.000 | | |
| 27 | 188.3134 | 5.000 | 42.97 | 1.83500 |
| 28 | 89.1702 | 27.700 | 71.31 | *1.56907 |
| 29 | −263.2570 | 166.992 | | |

(Variable Spacing in Zooming and Focusing)

When d0 = 9073.3 mm

| | | | |
|---|---|---|---|
| f | 84.000 | 110.000 | 151.000 |
| d5 | 0.743 | 13.738 | 25.152 |
| d14 | 26.245 | 16.791 | 1.860 |
| d18 | 4.608 | 1.067 | 4.584 |

When d0 = 4546.1 mm

| | | | |
|---|---|---|---|
| f | 84.000 | 110.000 | 151.000 |
| d5 | 2.248 | 15.244 | 26.658 |
| d14 | 26.245 | 16.791 | 1.860 |
| d18 | 4.608 | 1.067 | 4.584 |

(Condition Corresponding Value)

$f2 = -41.02357$
$f3 = 133.16379$
$f4 = -137.07619$
$f5 = 95.43145$
$c4 = 60.67258$
$f3n = -134.75330$
$f3p = 68.85952$
(1) $|c4/(f4 + f5)| = 1.457$
(2) $|f3/f4| = 0.971$
(3) $|f2/fw| = 0.488$
(4) $v3p/v3n = 0.774$
(5) $|f3n/f3p| = 1.957$

EMBODIMENT 3

Figure 3:
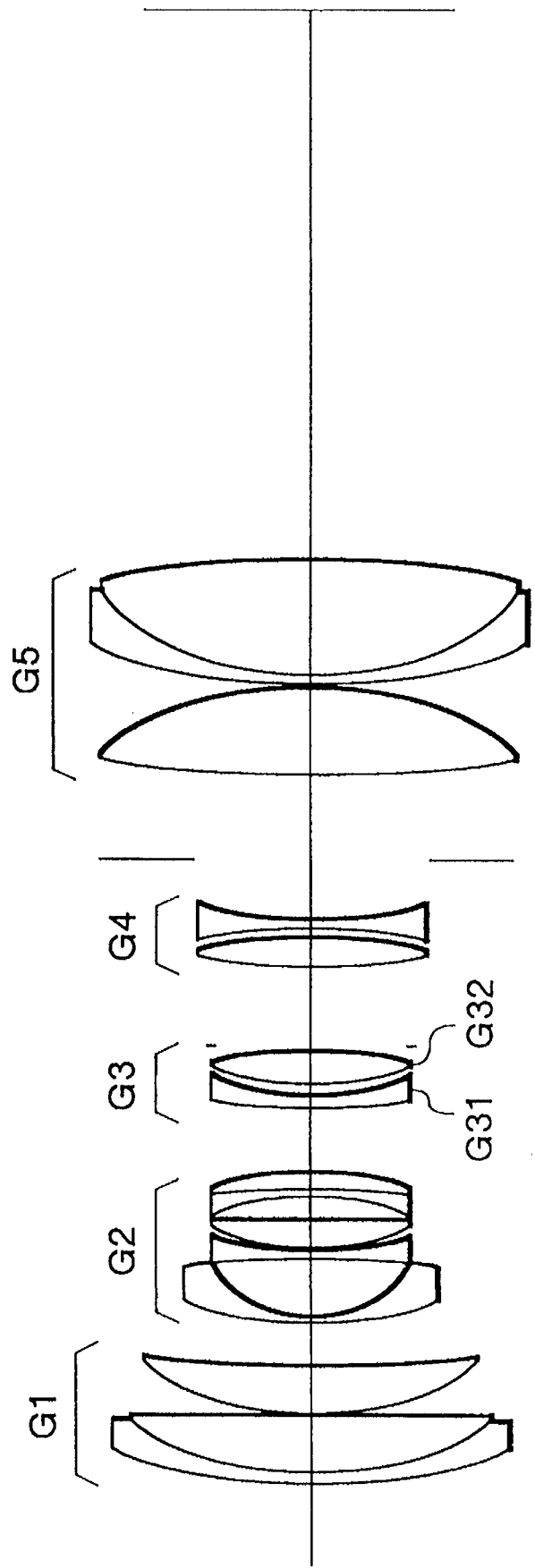
FIG. 3 is a view illustrating a layout of the zoom lens in a third embodiment.

FIG. 3 is a view illustrating a layout of the zoom lens system in a third embodiment of the present invention.

The illustrated zoom lens system comprises, sequentially from the screen side, the first lens group G1, the second lens group G2, the third lens group G3, the fourth lens group G4 and the fifth lens group G5. The first lens group G1 is composed of the cemented lens consisting of the negative meniscus lens with its convex surface toward the screen side and the positive meniscus lens with its convex surface toward the screen side and the positive meniscus lens with its convex surface toward the screen side. The second lens group G2 is composed of the negative meniscus lens with its convex surface toward the screen side, the biconcave lens, a plano-convex lens with its convex surface toward the screen side and the cemented lens consisting of the negative meniscus lens with its concave surface toward the screen side and the positive meniscus lens with its concave surface toward the screen side. The third lens group G3 is composed of the negative meniscus lens G31 with its convex surface toward the screen side and the biconvex lens G32. The fourth lens group G4 is composed of the biconvex lens and the biconcave lens. The fifth lens group G5 is composed of the biconvex lens and the cemented lens consisting of the negative meniscus lens with its convex surface toward the screen side and the biconvex lens.

Following Table 3 shows values of data in the embodiment 3 of the present invention. In Table 3, the numeral at the left end indicates the order of respective lens surfaces from the screen side, r designates the radius of curvature of each lens surface, d represents the spacing between the lens surfaces, and n and v denote the refractive index and the Abbe number with respect to the d-line (λ=587.6 nm). Note that f is the focal length, FNO is the F-number, 2ω is the view angle, and d0 is the on-axis air spacing between the screen and the lens surface closest to the screen.

Incidentally, the refractive index of a medium exhibiting an abnormal partial dispersibility is marked with (*).

TABLE 3 f = 84.0–151.0 mm
FNO = 2.71
2ω = 23.0–12.8°

| | r | d | v | n |
|---|---|---|---|---|
| 1 | 137.3803 | 3.000 | 23.83 | 1.84666 |
| 2 | 82.3135 | 14.800 | 60.35 | 1.62041 |
| 3 | 574.4056 | 0.100 | | |
| 4 | 76.9970 | 12.200 | 60.35 | 1.62041 |
| 5 | 333.1979 | (d5 = Variable) | | |
| 6 | 104.6596 | 1.700 | 42.97 | 1.83500 |
| 7 | 33.6967 | 15.000 | | |
| 8 | −206.1284 | 1.700 | 49.61 | 1.77250 |
| 9 | 70.8741 | 0.100 | | |
| 10 | 54.0310 | 8.500 | 25.46 | 1.80518 |
| 11 | ∞ | 5.850 | | |
| 12 | −56.3113 | 2.000 | 49.61 | 1.77250 |
| 13 | −237.1212 | 4.500 | 25.46 | 1.80518 |
| 14 | −103.3423 | (d14 = Variable) | | |
| 15 | 210.1664 | 2.000 | 42.35 | 1.79950 |
| 16 | 66.2194 | 2.000 | | |
| 17 | 75.0763 | 9.000 | 33.27 | 1.80610 |
| 18 | −165.7237 | (d18 = Variable) | | |
| 19 | ∞ | 21.600 | (Aperture Stop) | |
| 20 | 131.9860 | 6.000 | 42.97 | 1.83500 |
| 21 | −234.4021 | 1.800 | | |
| 22 | −159.6901 | 2.000 | 23.83 | 1.84666 |
| 23 | 73.7361 | 18.454 | | |
| 24 | ∞ | 27.000 | (Fixed Stop) | |
| 25 | 327.5717 | 21.000 | 71.31 | *1.56907 |
| 26 | −90.7395 | 1.000 | | |
| 27 | 205.2835 | 2.500 | 42.97 | 1.83500 |
| 28 | 81.0724 | 24.700 | 71.31 | *1.56907 |
| 29 | −249.4762 | 153.328 | | |

(Variable Spacing in Zooming and Focusing)

When d0 = 9073.3 mm

| | | | |
|---|---|---|---|
| f | 84.000 | 110.000 | 151.000 |
| d5 | 0.767 | 14.094 | 25.753 |
| d14 | 28.298 | 18.581 | 3.296 |
| d18 | 4.691 | 1.080 | 4.706 |

When d0 = 4546.1 mm

| | | | |
|---|---|---|---|
| f | 84.000 | 110.000 | 151.000 |
| d5 | 2.334 | 15.661 | 27.320 |
| d14 | 28.298 | 18.581 | 3.296 |
| d18 | 4.691 | 1.080 | 4.706tz,1/32 |

(Condition Corresponding Value)

$f2 = -42.02613$
$f3 = 133.17157$
$f4 = -159.57033$
$f5 = 94.87391$
$c4 = 53.62985$
$f3n = -121.67925$
$f3p = 65.18503$
(1) $|c4/(f4 + f5)| = 0.829$
(2) $|f3/f4| = 0.835$
(3) $|f2/fw| = 0.500$
(4) $v3p/v3n = 0.786$
(5) $|f3n/f3p| = 1.867$

As discussed above, according to the zoom lens system in the first through third embodiments, the zoom ratio is on the order of 1.8, the F-number is on the order of 2.7, and the marginal light quantity rate is approximately 70%, whereby it is possible to actualize the zoom lens system which is small both in size and in weight but exhibits a high contrast and a high resolution with a small amount of comatic flare.

It is apparent that, in this invention, a wide range of different working modes can be formed based on the invention without deviating from the spirit and scope of the invention. This invention is not restricted by its specific working modes except being limited by the appended claims.

What is claimed is:

1. A zoom lens system for projecting an image of an object on a screen, sequentially from a screen side, comprising:

a first lens group having a positive refracting power;

a second lens group having a negative refracting power;

a third lens group having a positive refracting power;

a fourth lens group having a negative refracting power; and a fifth lens group having a positive refracting power, wherein said first lens group is so disposed as to be movable for focusing along an optical-axis direction, said second lens group is so disposed as to be movable for zooming along the optical-axis direction, said third lens group is so disposed as to be movable for correcting a fluctuation in image position due to the zooming, said fourth and fifth lens groups are fixed with respect to the optical-axis direction during the zooming, and said third lens group has, sequentially from the screen side, a front lens unit having a negative refracting power and a rear lens unit having a positive refracting power.

2. A zoom lens system according to claim 1, wherein an aperture stop is disposed in an optical path between said third lens group and said fourth lens group.

3. A zoom lens system according to claim 1, wherein said third lens group has, sequentially from the screen side, one single lens having a negative refracting power and one single lens having a positive refracting power.

4. A zoom lens system according to claim 1, wherein said fifth lens group has at least one lens composed of a medium exhibiting an abnormal partial dispersibility.

5. A zoom lens system according to claim 4, wherein said first to fourth lens groups have no lens composed of the medium exhibiting the abnormal partial dispersibility.

6. A zoom lens system according to claim 1, wherein said third lens group, when correcting the fluctuation in the image position due to the zooming, moves on the optical axis along a concave locus toward the screen side.

7. A zoom lens system according to claim 1, wherein an image forming magnification of said third lens group satisfies the following relationship:

$$|\beta| \geq 1$$

where $\beta$ is the image forming magnification.

8. A zoom lens system according to claim 1, wherein said zoom lens system satisfies the following condition:

$$0.7 < |e4/(f4+f5)| < 2.0$$

where e4: the principal point spacing between said fourth lens group and said fifth lens group, f4: the focal length of said fourth lens group, f5: the focal length of said fifth lens group.

9. A zoom lens system according to claim 1, wherein said zoom lens system satisfies the following conditions:

$$0.7 < |f3/f4| < 1.3$$

$$0.35 < |f2/fw| < 0.65$$

$$v3p/v3n < 1$$

$$1.0 < |f3n/f3p| < 2.5$$

where f2: the focal length of said second lens group, f3: the focal length of said third lens group, f4: the focal length of said fourth lens group, fw: the focal length of said zoom lens system at wide-angle end, f3n: the focal length of said front lens unit in said third lens group, f3p: the focal length of said rear lens unit in said third lens group, v3n: the average value of Abbe numbers of lenses constituting said front lens unit in said third lens group, and v3p: the average value of Abbe numbers of lenses constituting said rear lens unit in said third lens group.

* * * * *